Sept. 20, 1966     R. M. PAGE     3,274,595

FREQUENCY MODULATED PULSE RADAR SYSTEM

Filed April 13, 1950     4 Sheets—Sheet 1

Inventor
ROBERT M. PAGE

By

ATTORNEYS

Sept. 20, 1966   R. M. PAGE   3,274,595
FREQUENCY MODULATED PULSE RADAR SYSTEM
Filed April 13, 1950   4 Sheets-Sheet 3

INVENTOR
ROBERT M. PAGE

BY
ATTORNEYS

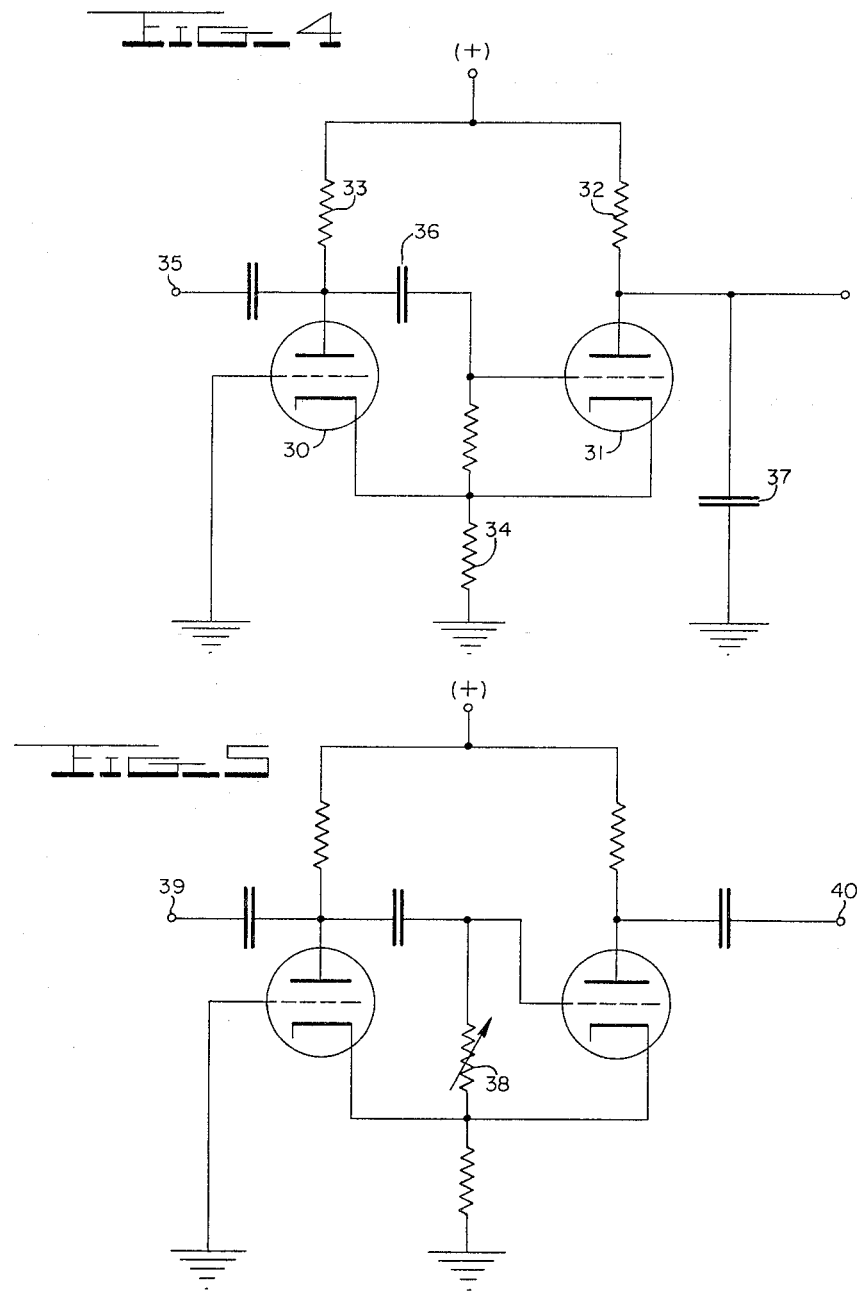

3,274,595
FREQUENCY MODULATED PULSE
RADAR SYSTEM
Robert M. Page, Camp Springs, Md.
(6715 Norview Court, Springfield, Va. 22150)
Filed Apr. 13, 1950, Ser. No. 155,773
7 Claims. (Cl. 343—17.2)

The invention described herein may be manufactured and used by or for the Government of the United States of America for governmental purposes without the payment of any royalties thereon or therefor.

This invention relates to impulse operative locator systems in general and in particular to locator systems having provision for reducing the effect of interference and also having a high degree of range resolution.

The problem of increasing operating range of conventionally operative locator systems, such as a radar system, generally resolves into the incorporation of some means of increasing signal to noise ratio at the receiver because when transmission equipment capable of generating pulse energy with peak powers in excess of several megawatts is available, it becomes less and less practical, for the present at least, to increase transmitter power. On the other hand, jamming transmitters operating with relatively small amounts of radiation capabilities can wreak havoc with conventional radar sets operating with their necessarily wide bandwidths.

Frequency modulation of the radiant pulse energy has heretofore offered little improvement in the face of either deliberate or unintentional jamming because the introduction of deliberate frequency modulation of the energy during transmitter pulses further widens the receiver intermediate frequency amplifier bandwidth requirements and hence broadens the frequency range over which interference can be effective.

In my copending application Serial Number 114,450, entitled "Radar System," filed September 7, 1949, there is described a new radar technique which can be applied to a system of frequency modulation of pulses, in which system there is no substantial increase in receiver intermediate frequency bandwidth requirements over those for pulses of nonfrequency modulated characteristics. This "Radar System" stores a part of the energy of each transmitter pulse in carrier waves at the frequency generated or at a frequency reduced therefrom and subsequently plays back the recorded transmitter signal at a suitable frequency which, when "beat" with received signals returned by reflection from distant objects, provides signals at the receiver intermediate frequency. With substantially the same signal employed for both signals thus being mixed, frequency variations occurring in the transmitter signal will also appear in the received signal in substantially equal proportion and thus will be eliminated in the "beat" or intermediate frequency signal.

With a method of frequency modulation thus introduced, another valuable feature thereof arises which has not heretofore been successfully applied in its entirety. This feature is of particular advantage in fire control or direction apparatus and effectively provides a sizable improvement in range resolution capabilities.

In conventional pulsed radar systems the maximum degree of range resolution is inversely proportional to the duration of the individual pulses (a time quantity) because time lapse is the measure of range. Thus a one microsecond pulse will blanket a range of 164 yards (two paths) while a ten microsecond pulse will blanket a range of 1640 yards. Such range blanketing is a limit first on the minimum range because the radar receiver cannot respond effectively to return signals received while the transmitter pulse is still existent but it also extends even to the maximum range rendering difficult the determination of the exact position of a target when long duration pulses are employed or making it nearly impossible to detect separately two objects located close together on the same bearing.

In a pulsed radar system employing the general method of deriving local oscillations at the receiver as taught in the above identified copending application, the adjustment of the time delay between the generation of a pulse of energy and its playback to occur in coincidence with the receipt of return energy from a selected range provides intermediate frequency signals only when a target is at the selected range. When frequency modulation is applied to the radio frequency pulses of energy the range (distance) over which return signals can be in the desired relationship with respect to the playback signal is reduced considerably. If the range setting is incorrect, the intermediate frequency signals obtained will generally be above the pass band of the intermediate frequency amplifier during part of the pulse and below the pass band during the rest of the pulse. Echo pulses which almost completely overlap as obtained from objects close together can generally be separated by proper adjustment of the range control.

In addition to this range gating and frequency modulation discrimination relative motion between the radar system location and a selected target, will generally, by Doppler effect, shift the frequency of return energy causing a change in the intermediate frequency signal and will require a continual adjustment of the range (playback delay). Because of this, closely spaced targets moving at different range rates with respect to the radar system can generally be further resolved.

It is accordingly an object of the present invention to provide a locator system having enhanced susceptibility to selected signals.

Another object of the present invention is to provide a method of reducing the effect of jamming or interfering signals on the operation of a locator system.

Another object of the present invention is to provide a locator system of the pulse-echo type having an improved degree of range resolution.

Another object of the present invention is to provide a locator system capable of distinguishing between objects located closely together.

Another object of the present invention is to provide a frequency modulated pulsed radar system having a narrow bandwidth signal responsive circuit of reduced sensitivity to interfering signals.

Other and further objects and features of the present invention will become apparent upon a careful consideration of the following detailed description when taken in conjunction with the accompanying drawings in which:

FIG. 4 shows a typical sweep generator suitable for use in the apparatus of FIG. 1.

FIG. 5 shows details of a range selector employed in the apparatus of FIG. 1.

In accordance with the fundamental features of the present invention, a locator system is provided having reduced susceptibility to interference and improved range resolution in which frequency modulated energy impulses are emitted in contrast to the substantially fixed frequency pulses of conventional radar systems. Frequency modulated transmitter pulses are stored and subsequently reproduced in coincidence with the receipt of return energy reflected from a distant object at selected range. The return signals thus obtained also bear the same frequency modulation characteristics as the emitted signals, thus when mixed therewith to obtain an intermediate frequency signal in more or less conventional fashion, the frequency modulation is quite thoroughly removed and subsequent manipulation of the signals through intermediate frequency stages and beyond may be in the conventional manner.

Figure 1:
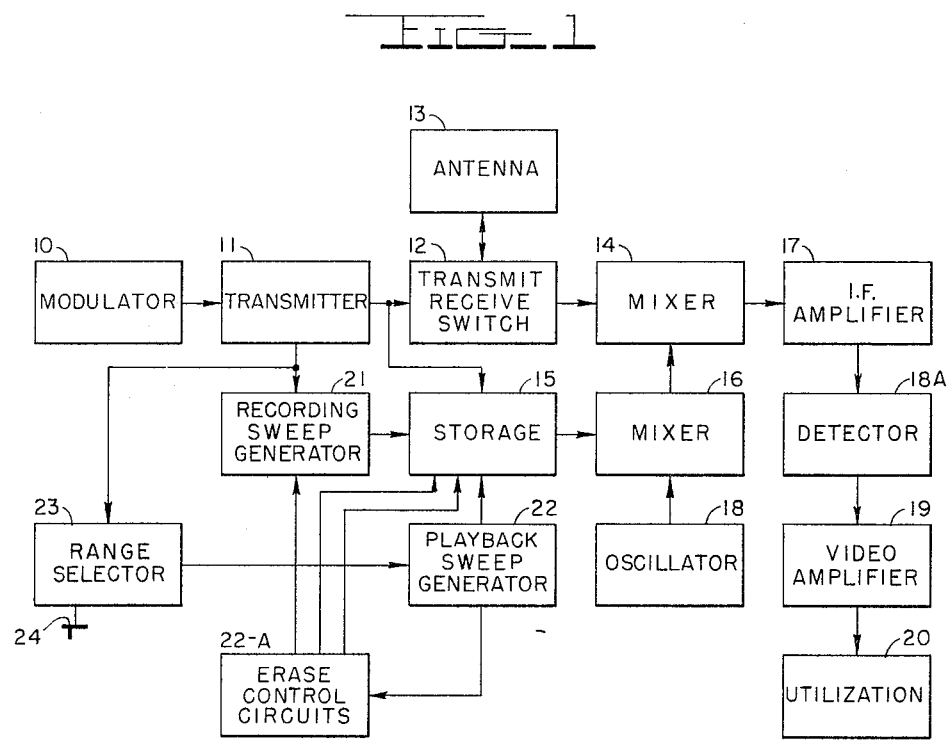
FIG. 1 shows in block form one embodiment of the features of the present invention.
Figure 2:
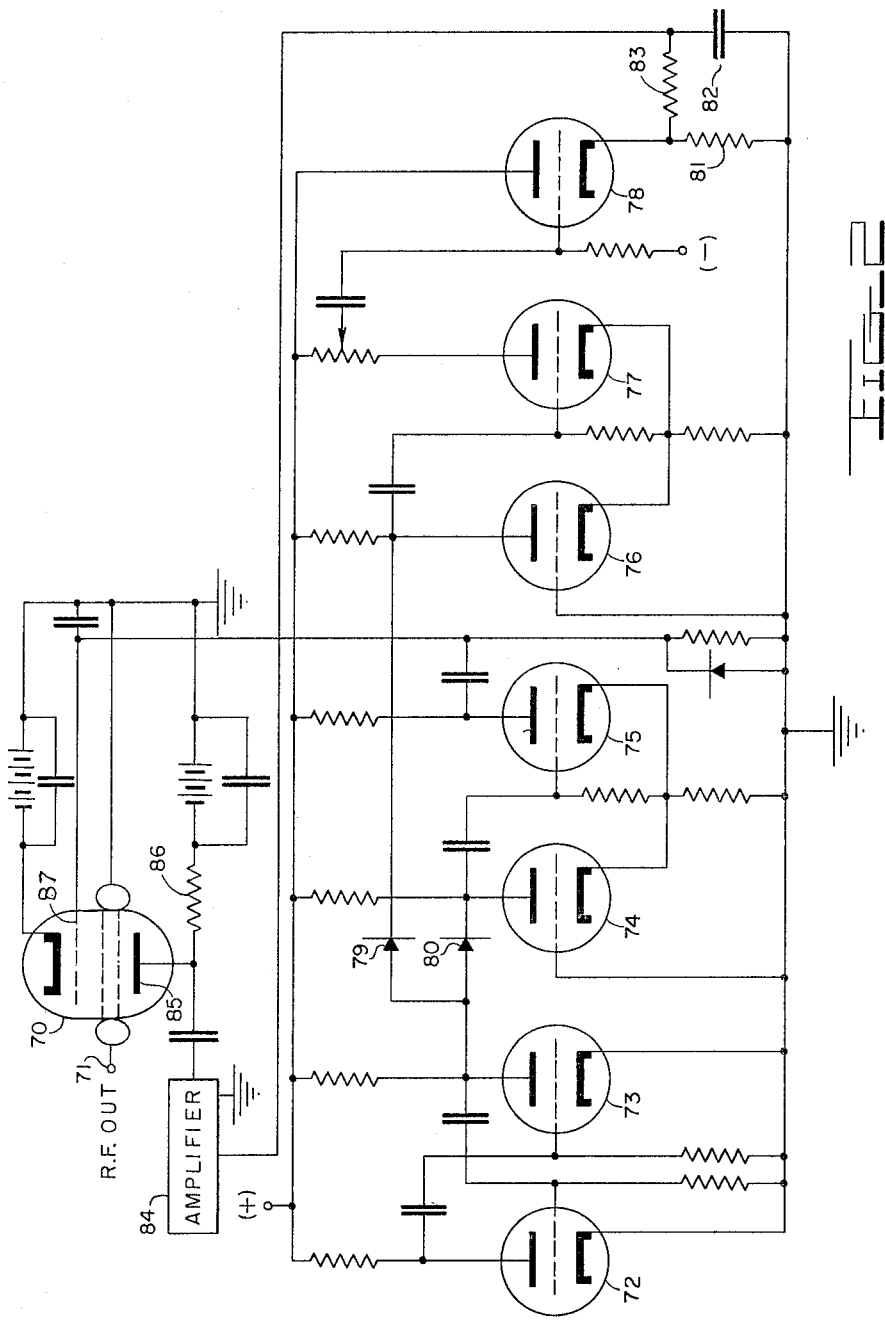
FIG. 2 shows details of a modulator and transmitter suitable for use with apparatus of the present invention.

With reference now to FIG. 1, a typical embodiment of the features of the present invention is shown in block form. Frequency modulated impulses of radio frequency energy occurring at a suitable repetition frequency are generated by the transmitter 11 and applied through the transmit-receive switch 12 to the antenna 13 for radiation thereby. General details of the transmitter 11 as well as modulator 10 are shown in FIG. 2 and are subsequently described at length in conjunction therewith. The pulses of frequency modulated energy produced by transmitter 11 may possess various schedules of frequency variation such as a sinusoidal or linear variation, however in many instances a back-to-back saw tooth variation is preferable. A back-to-back saw tooth variation may be defined for the present as one in which one extreme of modulation exists at both ends of the pulse, the other extreme exists at the middle of the pulse and the intervening spaces are filled with a linear variation in frequency from the one extreme to the other.

Transmit-receive switch 12 may be of any conventional form suitable for the general radar requirements of delivering transmitter energy to the antenna 13 and delivering received energy intercepted by antenna 13 to a first mixer 14. Typically the switch 12 will include ionizable gas filled diode type tubes.

Antenna 13 for a radar system of high accuracy will in general be highly directive in nature emitting and receiving energy in a narrow beam or "pencil" which may be positioned in the various directions from which location operation is desired. In some instances a full 360-degree scan, with elevation variation may be desirable, whereas in other instances a small sector coverage is satisfactory.

Figure 3:
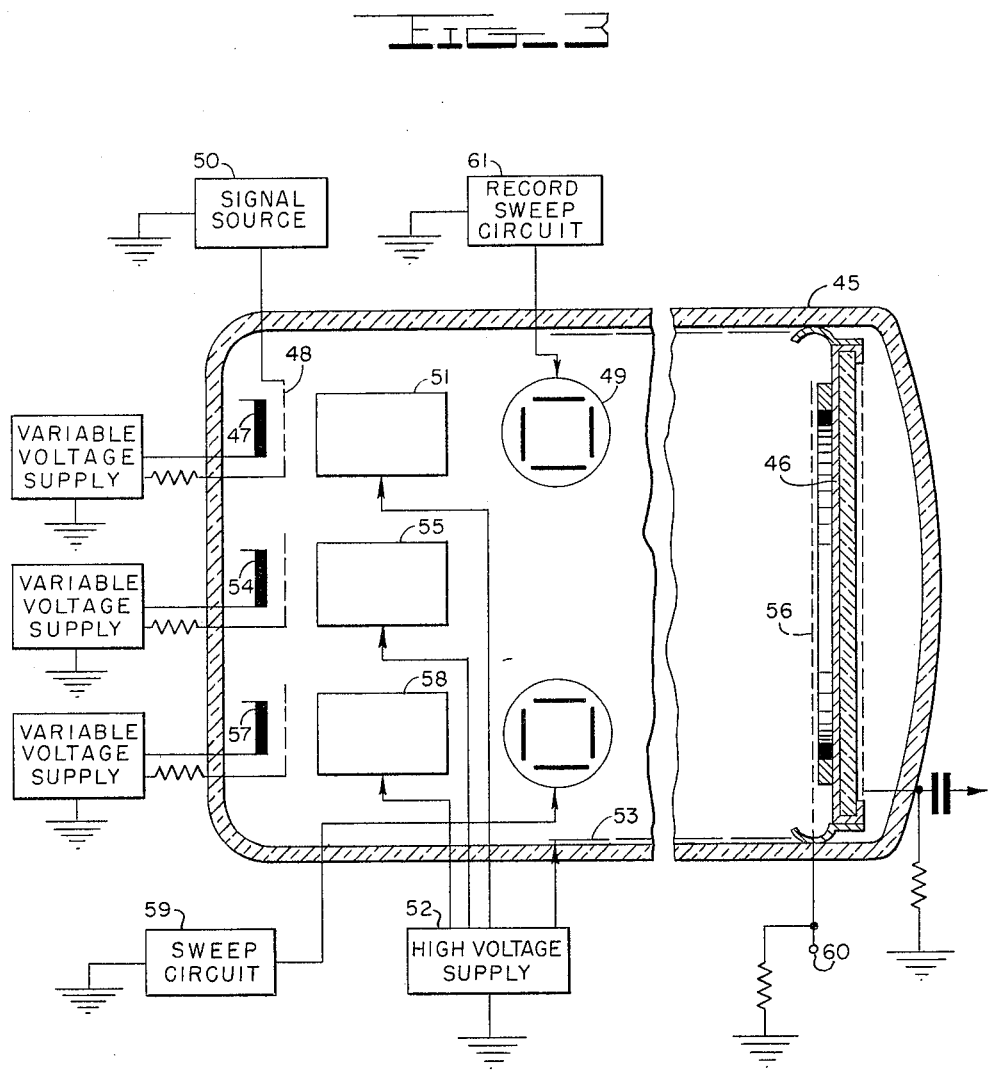
FIG. 3 shows details of a typical form of signal storage device suitable for performing the transmitter signal storage and playback required in the apparatus of FIG. 1.

Pulses of radio frequency produced by transmitter 11 are stored in part by storage device 15. Storage device 15 will in general include a suitable form of storage medium such as a storage dielectric capable of retaining transmitter signals in carrier wave form as generated or at a frequency altered therefrom. A typical storage tube suitable for operation at certain frequencies is described in a copending application of A. V. Haeff, Serial Number 768,790, filed October 15, 1947, entitled "Method of Storing, Maintaining, and Reproducing Electrical Signals and Means Therefor" now Patent Number 2,813,998. This tube is shown in FIG. 3 and will be subsequently described in detail. Where the transmitter 11 operates at high carrier frequencies it may be desirable to store the signals at a frequency reduced from the transmitter frequency rather than at the actual transmitter frequency. If such is the case, the storage block 15 of FIG. 1 will include an oscillator and two mixers coupled thereto. The first mixer is used to heterodyne the oscillator signal with the transmitter signal to obtain a lower frequency signal for storage. The second mixer then is employed in signal playback to heterodyne the stored signal with the oscillator signal to reproduce the transmitter signal frequency. In this connection it should be appreciated that the two mixers as well as the storage tube itself must have sufficiently wide bandwidth to accommodate the transmitter frequency swing during modulation as well as the pulse spectrum. In general the pulse spectrum is regarded as being equal in megacycles per second to twice the reciprocal of the pulse duration in microseconds. Thus a one microsecond pulse will require a two megacycle per second bandwidth circuit. Ordinarily this bandwidth will be relatively small compared to the bandwidth required for the frequency modulation but this point will be discussed later.

Played back stored signals from storage device 15 which are at the frequency generated by transmitter 11 go to a mixer 16 where they are altered in frequency by an amount equal to the frequency of the intermediate frequency amplifier 17 by a suitable oscillator 18. This alteration is provided by heterodyne action in the mixer 16 with a signal from the oscillator 18. To obtain such a signal, oscillator 18 is normally operative at the frequency of the intermediate frequency amplifier 17 or at a reduced frequency having a low order harmonic which is equal to the frequency of the amplifier 17.

The frequency sum signals from mixer 16 which differ from frequency of the transmitter 11 only by the frequency of the intermediate frequency amplifier 17, are delivered to mixer 14 where they are combined with received signals to obtain intermediate frequency difference signals at the tuned frequency of the amplifier 17. Mixers 16 and 14 again must have bandwidth capabilities suitable to pass the pulse spectrum and the maximum frequency deviation of the frequency modulation, the latter of which will normally be greater than the former.

Output signals from mixer 14 no longer possess the frequency modulation of the transmitter signal, such modulation being "wiped-out" by heterodyning two signals having the same frequency variational characteristic. The intermediate frequency amplifier must therefore have a bandwidth only wide enough to pass the frequencies represented by the pulse spectrum. Because of the frequency variation of the "local oscillation" signal from mixer 16, interfering signals operating at a constant frequency will be capable of reaching amplifier 17 for such short periods of time as to be relatively ineffective thereon. This is one reason for making the frequency deviation much larger than the bandwidth of amplifier 17 because then the intermediate frequency signal resulting from a fixed frequency interfering source will appear for such short periods of time as to require a bandwidth greater than that of amplifier 17. To fulfill these requirements, amplifier 17 need be no different from conventional radar intermediate frequency amplifiers.

Conventional frequency modulation detection techniques are not employed in the apparatus of the present invention. With the frequency modulation removed after its passage through mixer 14, the detector 18–A connected to the output of amplifier 17 may be a conventional amplitude modulation detector such as a diode having a time-constant filtering resistance-capacitance circuit.

Detected signals go to video amplifier 19 and utilization device 20 both of which may be conventional radar components designed to have a suitably wide bandwidth to properly pass the frequency spectrum of the pulse signals. Utilization device 20 may be any sort of indicator cathode ray or otherwise conventionally found in radar systems, such as an A scope, P.P.I. etc.

Recording and playback of the transmitter signals is accomplished under the control of additional circuitry yet to be described. The storage device 15 requires two sawtooth sweeping signals, one existing during the transmitter pulses for recording and the other occurring at some controlled later instant of time when playback of the transmitter signal in coincidence with the receipt of echo energy from selected range is desired.

To provide for signal storage a recording sweep generator 21 is employed. Generator 21 may be any suitable form such as a one-shot multivibrator controlling the charging of a time constant circuit capable of producing the short duration sawtooth sweep signals. Generator 21 is thus triggered as by a signal from the transmitter 11 itself to provide a sweeping signal for storage device 15 in coincidence with each transmitter pulse.

Playback sweeps for reproducing stored transmitter signals are obtained from the playback sweep generator 22 which may be similar to the recording sweep generator 21 in that it could be such a one-shot multivibrator controlling the charging of a time constant circuit. The source of signals initiating the production of the playback sweep signals is different, however. Since the playback of stored signals must occur in coincidence with the receipt of return energy from a selected range, delayed in time relative to the transmitted signal, some means is required for producing a second keying signal delayed with respect to that delivered from the transmitter 11 to the recording sweep generator 21. This means is the range selector 23 which receives the keying pulses from transmitter 11 and after selected delay controlled for example by a manually operated handwheel 24, provides the keying pulses for operation of the playback sweep generator 22. To satisfactorily provide this operation, the range selector 23 could assume one of many different forms such for example as a one shot multivibrator keyed into the unstable condition by the keying signal from the transmitter 11 and providing the signal for playback sweep generator 22 at the termination of the unstable condition. Where such a delay device is employed, the handwheel 24 can then conveniently be linked to a variable resistance placed in the time constant circuit determining the duration of the multivibrator unstable period.

For illustrative purposes the FIGS. 4 and 5 have been included. FIG. 4 shows a simple sweep generator suitable for 21 or 22 and includes the multivibrator of tubes 30, 31. In the stable state tube 31 is conductive because the grid thereof is returned to the cathode. Tube 31 is ordinarily arranged by the proportioning of resistances 32 and 33 so that tube 31 can conduct heavier than tube 30 and this heavy conduction by tube 31 provides sufficient bias across cathode resistance 34 to hold tube 30 cut off. This situation changes, however, whenever a negative pulse obtained from the transmitter 11 or modulator 10 is applied to the terminal 35 of sufficient polarity to cut tube 31 off. When this happens tube 30 comes to conduction and remains in that condition until capacitance 36 discharges through resistances associated therewith to unblock the grid of tube 31 so that tube 31 again becomes conductive.

In the stable condition of the generator, capacitance 37 is normally only partially charged by virtue of the potential drop across resistance 33 however when tube 31 is cut off in the unstable condition of the circuit, capacitance 37 charges toward the positive plate supply potential through resistance 33 to produce a sawtooth waveform at the output terminal. As the circuit reverts to the stable condition, tube 31 rapidly discharges capacitance 37 to its original stable voltage ready for a second operation.

The range selector 23 is typified by the circuit of FIGURE 5. This circuit is basically similar to the circuit of the just-described FIG. 4 however the equivalent of capacitance 37 is omitted and the grid resistance 38 is made variable to alter the time constant of the grid circuit determining the duration of the unstable period. Resistance 38 is controlled by the handwheel 24 of FIG. 1 to vary the duration of the unstable period. Negative input pulses obtained from the transmitter 11 or modulator 10 are supplied to one anode at terminal 39 in coincidence with negative pulses supplied to terminal 35 of FIG. 4 each time the transmitter 11 produces an output pulse signal. Delayed negative output pulses are produced at the other anode and delivered to terminal 40 and there applied to a sweep circuit similar to FIG. 4 for production of the playback sweep.

To explain signal storage and reproduction more adequately to facilitate understanding of the invention, reference is now made to FIG. 3 which shows generally, features of the storage tube of A. V. Haeff previously mentioned.

This storage tube has an insulator plate 45 with an active surface 46 placed thereon. Typically the plate may be of glass and the active surface distributed willomite particles.

An initial charge distribution pattern representative of the signal to be stored may be placed on the active surface 46 by an electron gun including the cathode 47. The beam energy of this gun may be controlled by grid 48 and deflection means 49 under control of signals to be stored as supplied from signal source 50. Source 50, in the case of storage device 15 of FIG. 1 may correspond to the transmitter 11. The electron beam is focused by a conventional lens electrode system shown diagrammatically at 51 for which is provided a high voltage supply 52. The main tube anode 53 coated on the interior of the envelope, is also energized by supply 52.

Signals placed on the active surface 46 are maintained thereon by delivering low velocity electrons thereto from an electron gun including the cathode 54 and focusing lens system 55.

Screen 56 possessing close spacing such as 200 mesh per inch collects secondary electrons emitted from the surface 46 upon bombardment by playback scanning electrons from a playback electron gun, including cathode 57 and focus-lens system 58. This playback scan is controlled by the playback sweep circuit 59. Output signals produced from the secondary emission current to screen 56 are obtained at terminal 60 and represent the output signals from the signal storage device 15. Record sweep circuit 61 controls the deflection of the record beam from cathode 47.

Signals stored as concentration variations of electrons on the surface 46 may be altered at will (or erased) by adjusting the balance between primary electrons reaching the surface 46 from cathode 47 and secondary electrons leaving it. Thus by proper alteration of the voltages existing on the tube, stored signals may be "erased." In actual operation of the tube there is a critical voltage condition (between the cathode and screen) for optimum recording, as well as another critical voltage between cathode and screen for optimum erasing. In the erasing operation the effectiveness or rapidity with which complete erasing may be accomplished depends upon the beam current hence a higher beam current will in general provide more effective erasure.

With the paritcular tube structure shown it is possible to achieve line by line erasure with the electron beam from either cathode 47 or 57 however in the particular application with the apparatus of the present invention it is generally preferable to employ the beam from cathode 47, normally considered the record beam, for erasure also.

For erasure the screen potential is ordinarily held constant while the cathode 47 potential is shifted to provide the critical erasing voltage between cathode and screen. Simultaneously the grid bias is reduced to increase the beam current for greater erasing effectiveness. As a general proposition the potential difference between cathode and screen is less for erasure than for writing.

The requirements for erasure in this apparatus are such as to offer little difficulty. As an example, the erasure control circuits 22–A in FIG. 1 may include merely a one-shot multivibrator having a stable state and an unstable state such as that shown in FIG. 5 which will be described in detail at a later point in the specification. Typically then, at the conclusion of each playback sweep produced by the circuit 22, a pulse signal is delivered to the erase control circuits 22–A (at terminal 39 FIG. 5) to initiate the unstable state therein. In this unstable state, signals are delivered to the storage 15 to adjust the potential of the electrodes of the "record" beam to those required for erasure. These signals are obtained typically at the anode of either tube and applied through suitable amplifier stages.

Practically simultaneously with the delivery of these signals, a trigger signal is delivered from the circuits 22–A to the recording sweep generator 21 to initiate a second sweep of the record beam which provides the erasure desired. As a further example the trigger signal may be taken from terminal 40.

With reference now to FIG. 2 details of portions of a typical modulator 10 and transmitter 11 are shown therein. It is to be understood that this showing of modulation and transmitter apparatus is not of necessity the preferred or the simplest form of equipment, it being shown in its present form for illustration only.

The transmitter tube 70 selected is of the reflex klystron type of such power handling capabilities as to provide the desired amount of radio frequency energy at terminal 71 for radiation by the antenna 13 (FIG. 1). Pulsed operation of tube 70 is controlled in repetition frequency by the multivibrator circuits of tubes 72–73, 74–75, 76–77, and the sawtooth generator of tube 78. The basic pulse repetition frequency of the system is established by the free running multivibrator of the tubes 72–73. This multivibrator controls the operation of two "slave" or one-shot multivibrators of tubes 74–75 and 76–77. These one-shot multivibrators have their stable states with tubes 75 and 77 conductive. Each time tube 73 becomes conductive in the free-running circuit, negative pulse signals are supplied through unilateral impedance elements 79, 80 to the anode of tubes 74 and 76 to initiate the unstable condition in the one-shot circuits. The duration of the unstable condition in these circuits may be established in several ways, particularly by setting the time constants in the grid circuits of the tubes 75 and 77, however as here connected, it is desirable that the one-shot circuit of tubes 74–75 have an unstable period exactly twice as long as the duration of the unstable period in the trigger circuit of tubes 76–77.

The one-shot circuit 76–77 drives a sawtooth generator charge tube 78 to produce voltage pulses across resistance 81. During each pulse across resistance 81, capacitance 82 charges exponentially through resistance 83, producing a positively rising sawtooth wave. At the conclusion of each pulse across resistance 81, capacitance 82 discharges exponentially through resistance 83 (and resistance 81) to produce a decreasing voltage. The double sawtooth signal thus produced is applied through a suitable amplifier circuit 84 to the voltage supply circuit for the repeller electrode 85 of the reflex klystron. Such repeller voltage variation effectively produces a frequency variation in the operation of the reflex klystron. The resistance 86 inserted in the repeller circuit assists in the development of this modulation voltage.

The klystron 70 is not a continuously operative device. In addition to the repeller voltage variation, the grid 87 is periodically provided with pulse type variation from the anode of tube 75 which operates to produce short duration pulses of current flow in the tube. By virtue of the two to one time duration relationship of the unstable period in the two circuits 74–75 and 76–77, respectively, the charging period of capacitance 82 occurs during the first half of each pulse of current in tube 70 whereas the discharging period of capacitance 82 occurs in the second half of each pulse. Thus is produced a pulse of energy having a frequency variation of a one-cycle back-to-back sawtooth nature. The total frequency variation from one extreme to the other is of necessity small on a percentage basis, being usually of the order of one-half or one percent of the carrier frequency. In terms of actual magnitude however it is quite large providing a maximum variation of 5 to 10 megacycles at a carrier frequency of 1000 megacycles per second. Such a variation when employed with the apparatus thus far described is adequate to provide a very great reduction in the effect of interference of either a deliberate nature, such as jamming, or of an unintentional nature such as random noise generated in the front end of a receiving system.

From the foregoing discussion it is apparent that considerable modification of the features of the present invention is possible without exceeding the scope thereof as defined in the appended claims.

What is claimed is:

1. In a pulse echo locator system having reduced susceptibility to interference the combination of frequency modulation transmitter means for producing radio frequency pulse signals possessing carrier frequency modulations therein, an antenna system connected to the transmitter means for emitting generated pulse signals and for intercepting return signals, storage means for recording the pulse signals, playback means for controlling the reproduction of recorded pulse signals in coincidence with the receipt of return signals from a selected range, and mixing means for combining reproduced signals and return signals to obtain cancellation of frequency modulations in the return signals.

2. In a pulse echo energy operative locator system, means for generating recurrent radio frequency pulse signals having carrier frequency variational characteristics, an antenna system connected to said means for emitting generated pulse signals and for intercepting return signals, signal storage means for recording the pulse signals at a carrier frequency reduced relative to that generated for an interval of time approximately equal to the pulse recurrence period, playback means for reproducing recorded pulses in coincidence with the receipt of return signals reflected from a selected range, frequency conversion means operative to alter the frequency of reproduced signals by a selected frequency, and mixing means for combining return signals and the frequency altered reproduced signals to obtain a beat frequency signal at the selected frequency.

3. In a pulse-echo locator system having reduced susceptibility to interference the combination of a pulse signal generator for providing recurrent pulses of carrier frequency energy possessing carrier frequency modulation, an antenna connected to said signal generator for radiating the signals produced thereby and for intercepting return signals reflected from distant objects, receiver means for amplifying return signals, a signal storage medium for recording each generated pulse, means for controlling the recording of each generated pulse by the storage medium, playback means for controlling the playback of recorded generated signals with selected time delay following the occurrence thereof to obtain a reference signal possessing the original frequency variational characteristics, an oscillator operative to provide a signal at a selected substantially constant frequency, a first mixer connected to the oscillator and to the signal storage medium operative to produce a beat signal between the oscillator signal and the playback recorded signals, a second mixer connected to the output of the first mixer and to the output of the receiver means operative to produce a beat signal, and utilization means connected to the output of the second mixer to indicate signals therefrom.

4. A pulse echo locator system having reduced susceptibility to interference comprising, a reflex klystron oscillation generator having a repeller electrode, amplitude modulation means for modulating the generator to provide pulses of carrier frequency energy, means for varying the potential of the repeller electrode of the generator during pulses of carrier frequency energy to frequency modulate the generated carrier frequency energy, an antenna system connected to the generator operative to radiate the energy produced thereby and to intercept return energy, a receiver connected to the antenna system operative to amplify intercepted return energy, storage means connected to the generator for recording cycle by cycle and for a finite period of time each pulse generated, means for controlling the reproduction of recorded signals to occur in coincidence with the receipt of return energy from a selected range, and means for mixing the reproduced recorded signals and the amplified received signals to obtain a beat signal in which frequency modulation introduced by the frequency modulation of the generator is removed.

5. In a pulse echo locator system, the combination of means for periodically emitting pulses of radio frequency energy and for receiving reflections thereof from remote objects, means for frequency modulating said radio frequency energy prior to emission thereof, means for recording said emitted frequency modulated pulses and for reproducing the same in the interval between successive pulse emissions, and mixing means connected to receive the reflected signals and reproduced signals.

6. In a pulse echo locator system, the combination of means for periodically emitting pulses of radio frequency energy and for receiving reflections thereof from remote objects, means for frequency modulating said radio frequency energy prior to the emission thereof, means for recording said emitted frequency modulated pulses and for reproducing the same in coincidence with the receipt of energy returned from a selected range, means for mixing the reproduced signals and the received energy reflections from said selected range to thereby remove the frequency modulation present on the reflected signals, and a fixed tuned signal translation circuit coupled to the output of the last named means for translating the signal output therefrom.

7. In a pulse echo locator system, the combination of means for periodically emitting pulses of radio frequency energy and for receiving reflections thereof from remote objects, means for frequency modulating the carrier frequency of the radio frequency energy pulses, means for recording said emitted frequency modulated pulses and for reproducing the same in coincidence with the receipt of energy returned from a selected range, means for mixing the reproduced signals and the received energy reflections from said selected range to thereby remove the frequency modulation present on the reflected signals, a utilization device, and a fixed tuned signal translation circuit coupling the output of the last named means to the utilization device.

References Cited by the Examiner
UNITED STATES PATENTS

| | | | |
|---|---|---|---|
| 2,361,437 | 10/1944 | Trevor | 250—6.45 |
| 2,422,135 | 6/1947 | Sanders. | |
| 2,425,657 | 8/1947 | Tunick | 332—6 |
| 2,467,670 | 4/1949 | Hershberger | 343—8 |
| 2,476,765 | 7/1949 | Pierce | 332—7 |
| 2,491,450 | 12/1949 | Holmes | 343—9.5 |
| 2,525,328 | 10/1950 | Wolff | 343—17.2 |

CHESTER L. JUSTUS, *Primary Examiner.*

SIMON YAFFEE, NORMAN H. EVANS, FREDERICK M. STRADER, *Examiners.*

A. GAUSS, A. K. GEER, R. BENNETT, G. J. MOSSINGHOFF, *Assistant Examiners.*